(12) United States Patent
Cooligan-Knoefel

(10) Patent No.: US 9,398,758 B2
(45) Date of Patent: Jul. 26, 2016

(54) PET LEASH ASSEMBLY

(71) Applicant: Kimberly Cooligan-Knoefel, Ottawa (CA)

(72) Inventor: Kimberly Cooligan-Knoefel, Ottawa (CA)

(*) Notice: Subject to any disclaimer, the term of this patent is extended or adjusted under 35 U.S.C. 154(b) by 0 days.

(21) Appl. No.: 14/093,010

(22) Filed: Nov. 28, 2013

(65) Prior Publication Data

US 2014/0158064 A1 Jun. 12, 2014

Related U.S. Application Data

(60) Provisional application No. 61/730,776, filed on Nov. 28, 2012.

(51) Int. Cl.
*A01K 27/00* (2006.01)

(52) U.S. Cl.
CPC ..................... *A01K 27/004* (2013.01)

(58) Field of Classification Search
USPC ......... 119/796, 795, 797, 798, 794, 792, 793, 119/772, 770, 769, 791
See application file for complete search history.

(56) References Cited

U.S. PATENT DOCUMENTS

| | | | |
|---|---|---|---|
| 5,429,075 A | 7/1995 | Passarella et al. | |
| 5,441,017 A | 8/1995 | Lindsay | |
| 5,826,547 A | 10/1998 | Gajewska | |
| 5,890,456 A * | 4/1999 | Tancrede | A01K 27/008 119/794 |
| 6,019,067 A | 2/2000 | Carey | |
| 6,076,717 A | 6/2000 | Edwards et al. | |
| 6,240,881 B1 * | 6/2001 | Edwards et al. | 119/795 |
| 6,314,917 B1 | 11/2001 | Ryan | |
| 6,619,239 B1 | 9/2003 | Benson | |
| 7,044,080 B2 | 5/2006 | Rabello | |
| 7,194,982 B2 | 3/2007 | Edwards | |
| 7,367,286 B2 | 5/2008 | Beaupre | |
| 7,410,197 B2 | 8/2008 | Edwards | |
| 7,695,035 B2 | 4/2010 | Summer et al. | |
| 7,819,088 B2 | 10/2010 | Stern | |
| 8,061,305 B2 | 11/2011 | Sugalski | |
| D651,767 S | 1/2012 | Dias | |
| 8,104,145 B1 | 1/2012 | Hajianpour | |
| 8,201,964 B2 | 6/2012 | Mattheis | |
| 2006/0054107 A1 | 3/2006 | Baker | |
| 2006/0118062 A1 * | 6/2006 | Edwards | A01K 27/004 119/796 |

(Continued)

FOREIGN PATENT DOCUMENTS

AU 2010101274 1/2011

OTHER PUBLICATIONS

"Dog Leash Dumbbells—The Green Head", Ominea, retrieved from the internet Jul. 6, 2013, 4 pages.

(Continued)

*Primary Examiner* — Trinh Nguyen

(74) *Attorney, Agent, or Firm* — Kathleen E. Marsman; Borden Ladner Gervais LLP

(57) ABSTRACT

Disclosed herein is a pet leash assembly having a weighted hand grip. The hand grip has a first end and a second end. A leash is operationally connected to the first end. A container is coupled to the second end which is opposite the first end. The leash assembly may optionally include a second container, and a removable cover portion may be reversibly coupled to the containers for closing the containers. The weighted hand grip is configured so that, when in use, the weighted material is disposed in the palm of a user. Also disclosed is a kit comprising the components of a pet leash assembly.

7 Claims, 10 Drawing Sheets

(56) References Cited

U.S. PATENT DOCUMENTS

| | | |
|---|---|---|
| 2006/0272595 A1 | 12/2006 | Edwards |
| 2008/0216767 A1* | 9/2008 | Wang ............... A01K 27/006 119/795 |
| 2009/0095225 A1 | 4/2009 | O'Connell |
| 2009/0183691 A1 | 7/2009 | Hassan |
| 2010/0018468 A1 | 1/2010 | Rabello |
| 2010/0300375 A1 | 12/2010 | Yang |
| 2011/0232031 A1 | 9/2011 | Salais |

OTHER PUBLICATIONS

Dalsky et al., "Weight-Bearing Exercise Training and Lumbar Bone Mineral Content in Postmenopausal Women", Annals of Internal Medicine, Jun. 1988, vol. 108, pp. 824-828.

* cited by examiner

PET LEASH ASSEMBLY

CROSS REFERENCE TO RELATED APPLICATIONS

This application claims the benefit of priority of U.S. Provisional Patent Application No. 61/730,776 filed Nov. 28, 2012, which is incorporated herein by reference in its entirety.

FIELD

The present disclosure relates generally to a pet leash assembly. More particularly, the present disclosure relates to a pet leash assembly that has a weighted hand grip.

BACKGROUND

It is well known that walking provides many physical benefits, including increasing cardiovascular and muscular fitness. These responses are increased by introducing a pronounced swinging motion of the arms and can be increased even further by using hand weights. It is difficult for a pet owner to receive the added cardiovascular or muscular benefits that are derived from holding a hand weight while walking their pet as it is difficult to hold a hand weight in addition to holding a leash.

In addition, pet owners are required to pick up and carry their pet's waste, usually in a bag. When carrying a bag of waste a person typically does not walk with the same arm stride as they did before picking up the feces. It has been found that a person carrying bag of waste reduces their arm swing in order to reduce the swinging of the bag. The reduction in arm swing results in a decrease in the cardiovascular response that would normally occur in the individual if their arm swing were not reduced.

A leash with an integrated weight is known in the art. For example, U.S. Pat. No. 6,619,239 B1 discloses a weighted pet leash assembly that includes a hand weight having opposite weighted sections connected to each other by a handle, i.e. a "dumbbell" shape hand weight. Disadvantageously, the opposite weighted sections can produce strain on the dog's walker's wrist and elbow when the opposite weighed sections are rotated about an axis perpendicular to the handle of the hand weight.

Pouches for carrying pet waste are known. For example, U.S. 2006/0054107 A1 discloses a waste carrying pouch that is attachable to a leash. U.S. Pat. No. 6,035,809 discloses a leash pouch for containing waste. U.S. Pat. No. 7,367,286 B2 discloses an implement for carrying waste while using a leash. U.S. D651,767S discloses a bilateral leash pouch for dog waste and personal items. However, these pouches will swing when full of waste. As a result the walker will reduce their arm swing, resulting in a loss of cardiovascular benefit for the walker.

In addition, leashes comprising storage containers are known. U.S. Patent Application No. US 2010/0300375 discloses a dog leash grip handle having a storage means. This grip handle is adapted to hold and dispense a roll of plastic bags. US 2010/0018468 A1 discloses a dog leash handle assembly with removable storage containers. The containers are designed to store food and water for a pet. They are not designed to store pet waste as they are compact in design.

It is, therefore, desirable to provide a leash assembly that allows an owner increase their cardiovascular fitness while also providing storage for pet waste or other items.

SUMMARY

It is an object of the present disclosure to obviate or mitigate at least one disadvantage of previous pet leashes or pet leash assemblies.

In a first aspect, the present disclosure provides a pet leash assembly comprising a weighted hand grip. The weighted hand grip has a first end and a second end, the second end being opposite the first end. A leash is operationally coupled to the first end and a container is coupled to the second end. The pet leash assembly may comprise a second container connected to the first end. The second container may house a retractable leash. First and second removable cover portions may be coupled to the first and second containers for closing the containers.

In an embodiment, the weighted hand grip defines a recess for receiving a weighted insert. In a further embodiment, weighted hand grip is integral. In certain embodiments the coupling mechanism includes a retractable leash. The retractable leash may be housed in the first or second container. The first or second container or both the first and second container may be reversibly connected to the hand grip. The pet leash assembly may have a tab connected to the second end of the hand grip and a detent mechanism on the container. The tab comprises an outward projection. The projection has a groove that engages the detent mechanism when the hand grip is coupled to the container.

The cover portions may be reversibly connected to the containers by a second tab and detent mechanism. A tab may be connected to the container, the tab comprising an outward projection. A detent mechanism connected to the cover portion, the detent mechanism having a groove. The projection fits in the groove and engages the detent mechanism when the container is coupled to the cover portion.

The weighted insert or the integral weighted hand grip may weigh at least 0.5 or at least 1 pound. In a further aspect, the present disclosure provides a pet leash assembly comprising a hand grip having a first end and a second end, the second end being opposite the first end. The pet leash assembly has a weight, and at least 50% of the weight of the pet leash assembly is distributed in the hand grip, between the first end and the second end. The pet leash assembly also comprises a coupling mechanism connected to the handle for coupling the handle to a pet.

In a further aspect, the present disclosure provides a hand grip defining a recess, the recess for reversibly receiving a weighted insert such that the weighted insert is disposed substantially centrally in the hand grip. In use, the weighted insert is substantially disposed in the palm of a user. A retractable leash is coupled to the hand grip and a container is coupled to the hand grip, the container for receiving and retaining items to be stored therein. A removable cover portion is reversibly coupled to the container for closing the container.

In a further aspect, the present disclosure provides a kit comprising components of a pet leash assembly. The components include: a weighted hand grip or a hand grip defining a housing for receiving a weighted material; a retractable leash configured to couple with the hand grip; and, optionally, at least one container configured to couple with the hand grip, weighted hand grip or retractable leash. In an embodiment, the kit comprises at least one additional weight or weighted hand grip.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Figure 1:
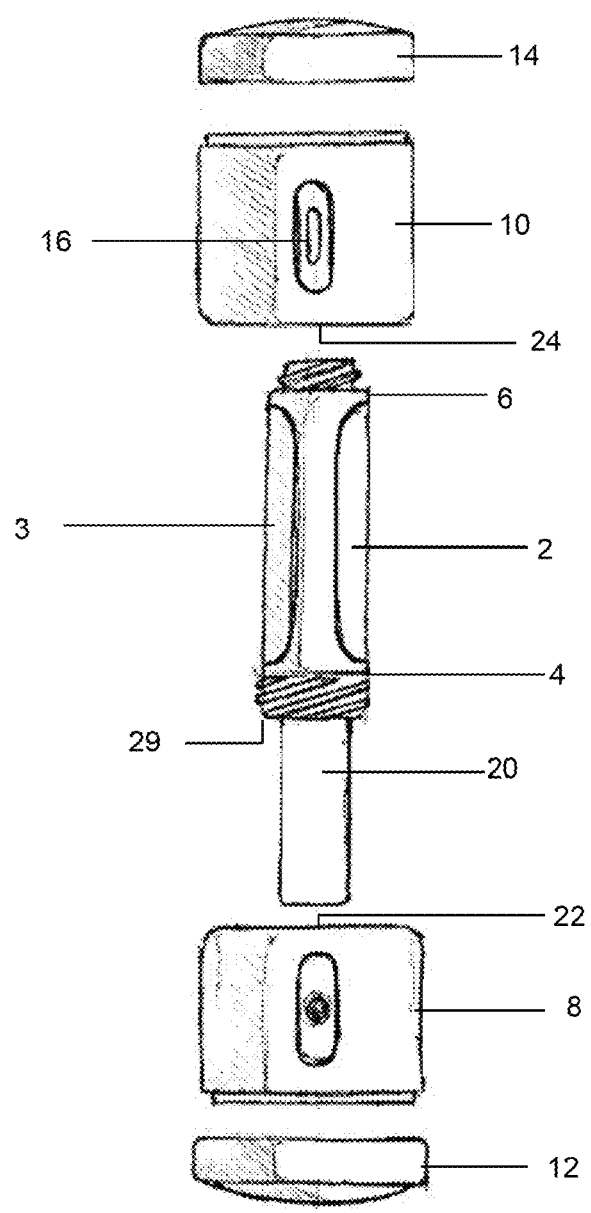
FIG. 1 is a perspective view of a pet leash assembly in accordance with an embodiment of the present disclosure.

The present disclosure provides a leash assembly having a weighted hand grip. The weight of the hand grip is disposed substantially centrally in the hand grip so that, when in use, the weight is disposed in the palm of a user. Having the weight centered in the palm of the hand is believed to reduce joint strain associated with tortional strain produced when the wrist is twisted perpendicularly to the length of the hand grip. The leash assembly can have a container that can receive a bag of pet waste. Advantageously, after collecting pet waste and storing the waste in the container, the pet owner is able to maintain a swinging motion of the hand gripping the pet leash assembly without having to worry about swinging the waste-filled bag too vigorously. Thus, a user is able to maintain a full arm swing for both arms and thereby receives the cardiovascular benefits that are associated with arm swinging.

As used herein, the term "hand grip" refers to the portion of the leash assembly that is gripped by a user's hand.

The term "weighted insert" and "weighted material" are used interchangeably and refer to any material that may be used to weight the hand grip. In certain embodiments, the hand grip may be made to receive a weighted insert. The weighted insert may be a common household item such as sand, rocks, marbles, coins or other suitable material. The weighted insert may also be in the form of a bar or cylinder that has a set, standardized weight and is sized and shaped to be received within the housing, or recess of the hand grip. The weighted bar may be adapted so that when it is inserted in the recess, it is firmly retained within the hand grip and does not move about as the leash handle is swung by the user. Suitable materials for making a standardized weight would be known to a person of skill in the art, but may include for example, iron, steel, lead, etc.

In certain embodiments, the hand grip may be made with a weight that is permanent. In this embodiment, the weight is not removable. In such case, the hand grip and the weight are integral and form an integral weighted hand grip. As with the weighted insert, suitable materials for making a standardized weight or an integral weighted hand grip would be known to a person of skill in the art, but may include for example, iron, steel, lead, etc. Suitable materials for making the hand grip or leash assembly would be known to a person of skill in the art. Examples of suitable materials include polyethylene, polypropylene and any other suitable plastic or materials. In addition, the hand grip may be ergonomically shaped to allow for better and more natural grip.

The weighted hand grip may be any suitable weight and may be varied depending on the user's fitness level and specific needs. For example, the weight may be 0.5, 1, 1.5, 2, 2.5, 5 or up to 5 pounds. In some embodiments, a heavier weight may be used, i.e. 7, 8, 9, or 10 pounds.

The weighted hand grip, ie, a hand grip having a weighted insert (including standardized weights) or integral weighted hand grips, may be interchangeable in the assembly, allowing a user to customize their selected weight depending on their ability and fitness goals. Because the weights are interchangeable, it is possible for the user to control the amount of weighted inserts and to use weighted inserts or weighted hand grips only if desired.

In certain embodiments, the hand grip is designed such that the weight of the hand grip extends no further than the first and second ends of the hand grip. At least 80%, 90% or 95% of the weight of the hand grip is disposed in the user's hand when in use. Thus, the weight is centered and the weight does not overhang the ends of the hand grip. Consequently, the weight is not distributed in opposite end portions of the assembly. It is believed that centering the weight in the palm of a user's hand reduces the strain on the user's joints, including the wrist and elbow. Furthermore, it is believed that having the weighted material disposed substantially centrally in the hand grip makes it easier to grip the handle thereby reducing the recruitment of conjunctive adjoining muscles, allowing a user to strengthen the targeted muscle. By having the weight disposed centrally in the hand grip in the embodiments, it is meant that the weight extends no further than the ends of the hand grip.

This is in contrast to a dumbbell shaped handle where the weight is distributed in opposite weighted end portions. Since the weight has a dumbbell shape, the ends protrude beyond the portion of the handle that a user's hand grips. Thus, there is a significant portion of weight that is not centralized on the palm of the user's hand. This arrangement is believed to result in considerable stress being applied to the user's joints, including the wrist and elbow especially when the dog jerks.

The pet leash assembly may be coupled to a pet using a coupling mechanism. The coupling mechanism is operationally connected to the hand grip. It is understood that the term "operationally connected" means that the coupling mechanism may directly couple the hand grip to a leash or may indirectly couple the hand grip to a retractable or non-retractable leash. Any suitable coupling mechanism that allows for the reversible coupling of a leash directly or indirectly to the hand grip is considered within the scope of the present disclosure. For example, in an embodiment, the coupling mechanism is a ring operationally connected to the hand grip. The coupling mechanism may also comprise a clip for connecting a ring to a standard leash. A clip may be a carabineer; however, any suitable clip could be substituted without departing from the scope of the present disclosure. The coupling mechanism may also comprise a retractable pin, such as the one described in U.S. Pat. No. 7,044,080. The coupling mechanism may include a spring loaded, vertically aligned pin that is retractable and allows leash installation by inserting the loop of a leash and releasing the pin such that it secures the loop of the leash. A coupling mechanism is also meant to include a means to couple a retractable leash to the leash hand grip or to a container. The handle may have a second point of attachment for a leash, allowing the leash to be attached in two positions to the handle or allowing two leashes to be attached. The leases are in turn coupled to a pet's collar.

Retractable leashes are well known in the art. A typical retractable leash is extendable from and retractable to a housing. The housing comprises an opening through which the leash extends and retracts and typically contains a spring-biased reel for taking up a remaining length of the leash. Associated with the retractable leash is an actuator that permits a user to arrest and release the spring based reel allowing the user to lock the leash in place or allowing the extension or retraction of the leash. The actuator is typically mounted proximate a hand grip allowing the user to selectively activate or control the leash mechanism while maintaining a grip on the hand grip. In one embodiment, the actuator is a dual position switch, movably mounted on the leash assembly proximal to the hand grip portion such that it is activatable by a user's finger.

In certain embodiments the handle or the leash assembly may comprise one or more containers. The containers may be multi-purpose and are adapted for receiving and storing items therein. The term "items" refers to any items a pet owner may wish to carry and store and may include, for example, keys, a flashlight, medicine, bags, a mobile device, or provisions for a pet. The bags may be detachably connected or loose such as grocery bags.

In an embodiment, the container may be used to store bag(s) containing pet waste allowing the user to discretely carry unsightly bags of pet waste. Housing the pet waste in the container is convenient but also allows the user to have a free hand to allow for arm swinging. Because the waste-filled bag is secured in the container, the pet owner is also able to maintain the swinging motion of the arm that is gripping the handle or pet leash assembly without having to worry about swinging the bag too vigorously. Thus, a user is able to maintain a full arm swing for both arms and thereby receives the cardiovascular benefits that are associated with arm swinging.

The container may be reversibly attached to the hand grip or may be made integrally with the hand grip. When the container is made integrally with the hand grip, the container may comprise an opening that would allow access to the hand grip for inserting and removing the weighted material, In one embodiment, a plug is provided that engages with the opening to retain the weight in the hand grip.

The container has a cover portion that closes the container but also affords easy entry and access to the contents of the container. The cover portion may be connected to the container by means of a hinge. The hinge may be spring loaded allowing the opened container to return quickly and easily to the closed position. The cover portion may also be a separate element that is reversibly fastened to the container. Means for reversibly fastening the container and cover portion would be known to a person of skill in the art. For example, the container and cover portion may engage by snap fit or the container may have an externally threaded surface region adapted to be connected to an internally threaded surface region of a cover portion. Alternatively, each container may have an arcuate retaining flange that engages with a mating portion, or lip, on the cover portion. The attachment process includes sliding the lip under the flange and rotating the cover portion to secure the cover portion in place.

Together with the cover portion, the storage container may be firmly sealed rendering the container airtight or water tight. When the container is being used to carry feces, the airtight seal is advantageous as it reduces the unpleasant odor associated with the feces. The container may threadingly engage the hand grip, but any means of connecting the container with the hand grip is contemplated. Means of coupling the container to the hand grip would be known to a person of skill in the art.

The components of the leash assembly may be modular, in that all parts may be removable and/or interchangeable. The components of the leash handle may also be differently sized or coloured allowing the owner to customize the leash handle in accordance with their needs or tastes. The cover portions may be made of different shapes, sizes and colours. For example, they may be decoratively shaped, i.e. in the shape of a dog bone. In addition, the retractable leash may be sized according to the size of the pet or in response to an owner's preference. This gives the user the ability to walk more than one pet with one leash assembly or handle as a user can interchange retractable leashes depending on the size of the pet(s) to be walked.

The disclosure also provides a kit comprising components of a pet leash assembly, the components comprising a weighted hand grip or a hand grip defining a housing for receiving a weighted material, a leash coupling mechanism, and optionally one or more containers. The kit may contain at least one additional standardized weight or weighted hand grip.

Typically, power walking includes walking with a pair of weights in order to maintain muscular balance and to increase the cardiovascular and muscular benefits. Therefore, it is contemplated that the handle for coupling to a pet leash or the pet leash assembly disclosed herein would be used in combination with a weight to be held in the user's opposite hand. The additional weight could be a weight of any suitable weight and could be configured such that at least 80% of the weight is distributed in the palm of the user's hand.

The weighted hand grip of the leash assembly disclosed herein allows a user to increase their cardiovascular health while walking their pet. Having a weighted hand grip is of particular advantage to an owner of a dog that walks very slowly or is very erratic. Using the weighted leash assembly, an owner is able to maintain a cardiovascular workout even when standing still. Users of all ages and strengths would be able to use the handle or leash assembly disclosed herein to increase the fitness and strength of their heart and muscles regardless of the distance walked.

FIG. 1 shows a perspective view of an embodiment of a pet leash assembly. The pet leash assembly has a hand grip 2 having a first end 4 and a second end 6. The first end 4 and second end 6 are reversibly attached to first and second containers 8, 10. Removable cover portions 12, 14 are reversibly coupled to containers 8, 10, to close or seal the containers. A coupling mechanism 16 in the form of a ring is connected to cover portion 14 and is used to reversibly couple the handle directly or indirectly to a leash. In this embodiment, a clip or clasp (not shown) is attached to the coupling mechanism 16 to connect the ring to a leash (not shown). In the present embodiment, the hand grip 2 comprises a housing 3 having a recess 29 for receiving a weighted insert 20. However, embodiments where the hand grip is made from a weighted material (an integral weighted hand grip) are also within the scope of the present disclosure.

The weighted insert 20 may be a one pound weight, but it is understood that a weighted insert of any suitable weight may be inserted in the hand grip 2. The containers 8 and 10 each comprise a retaining mechanism 22 and 24 for releasably connecting the container to the hand grip and for retaining the weighted insert 20 in the hand grip 2. The hand grip 2 comprises threads which threadingly engage with corresponding threads on the retaining members 22 and 24 of the containers 8 and 10. A person of skill in the art would understand that there are many suitable means of connecting containers to the hand grip. For example, the cover portions may couple using a snap fit mechanism or a locking mechanism. Once the containers are connected to the hand grip, the weighted insert is held securely in place. In use, the weight is substantially centered within a user's palm.

In another embodiment, one container can be permanently secured to the hand grip while another container can be removably secured to allow access to the housing or recess for placement and removal of the weighted insert. If the hand grip is itself made of a weighed material, then the containers and can be reversibly or permanently secured to the hand grip. Although the coupling mechanism 16 (a ring) is shown connected directly to the cover portion, this need not be the case.

In some embodiments, at least at least 50%, 60%, 70%, or 80% of the total weight of the pet leash assembly is distributed in the hand grip between the first and second ends. With this arrangement, the weight is positioned in the user's hand so as not to cause joint strain when in use.

Figure 2:
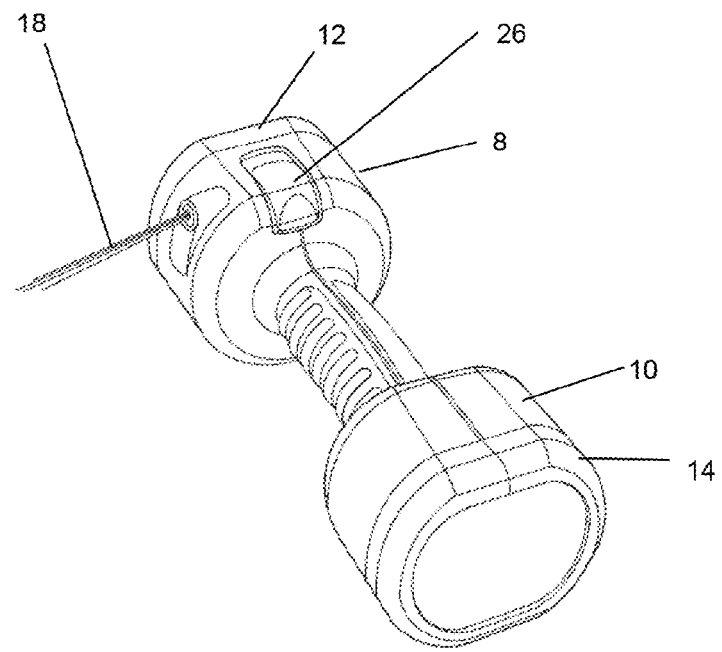
FIG. 2 shows various views of a pet leash assembly in accordance with another embodiment of the present disclosure.
Figure 2:
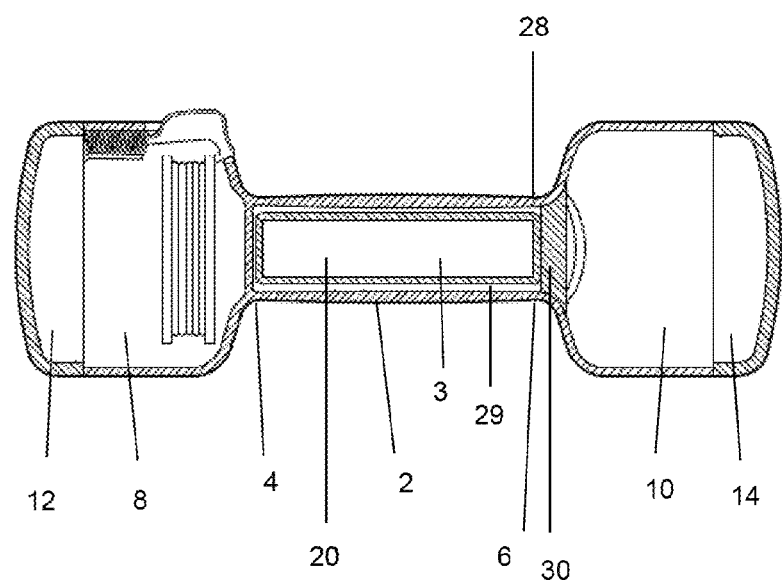

FIG. 2 shows multiple views of another embodiment of a leash assembly of the present disclosure. The leash assembly comprises a hand grip 2 having a first end 4 and a second end 6. The hand grip 2 comprises a housing 3 having a recess 29 and defining an opening at the second end 6 for reversibly receiving a weighted insert 20. The weighted material is disposed substantially centrally in the hand grip so that, when the leash assembly is in use, the weighted insert is disposed in the hand of a user. In this embodiment, the hand grip 2 is integrally formed with first and second containers 8, 10. The container 10 has an opening 28 in its base surface which allows a user to access the recess 29 defined by the hand grip 2 and to insert or remove the weighted insert therefrom. A removable plug 30 fits into the opening 28 in the container and is sized and shaped to close the opening 28 and to retain the weight securely in the hand grip. The plug 30 may be adapted to retain the weighted material insert so that is does not move about as the user is walking. Removable cover portions 12, 14 are coupled to the containers 8, 10 and connect to the containers using a snap fit mechanism, engaging with the containers to close the container. A retractable leash 18 is housed within container 8. The retractable leash includes an actuator 26 that can be set to lock the retractable leash in a desired position. In this embodiment, the leash extends from the container in a direction that is substantially perpendicular to the length of the hand grip 2, which extends between the first end 4 and the second ends 6. Actuator 26 is functionally connected and engageable with the leash and is positioned such that a user's finger may easily engage the actuator when the hand grip is being gripped by the user. A partition or leash cover (not shown) may be included in container 8 to separate the retractable leash mechanism from contents that may be placed in the container.

In another embodiment, the retractable leash can be positioned so that it is pulled out from the container in a direction that is substantially parallel to the length of the hand grip, the length of the hand grip extending between first end and second end.

Figure 3:
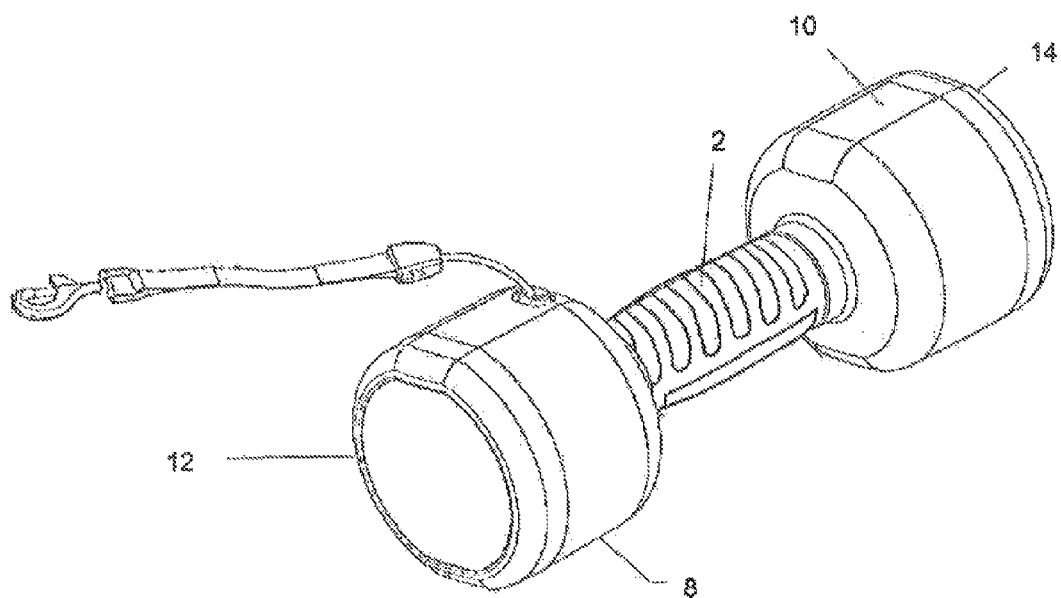
FIG. 3 is a perspective view of a pet leash assembly in accordance with another embodiment of the present disclosure.

FIG. 3 shows an embodiment of a leash assembly in accordance with the present disclosure. In this embodiment hand grip 2 is permanently secured to containers 8 and 10. Containers 8 and 10 are in turn, reversibly connected to cover portions 12 and 14. A retractable leash is housed within container 8.

Figure 4:
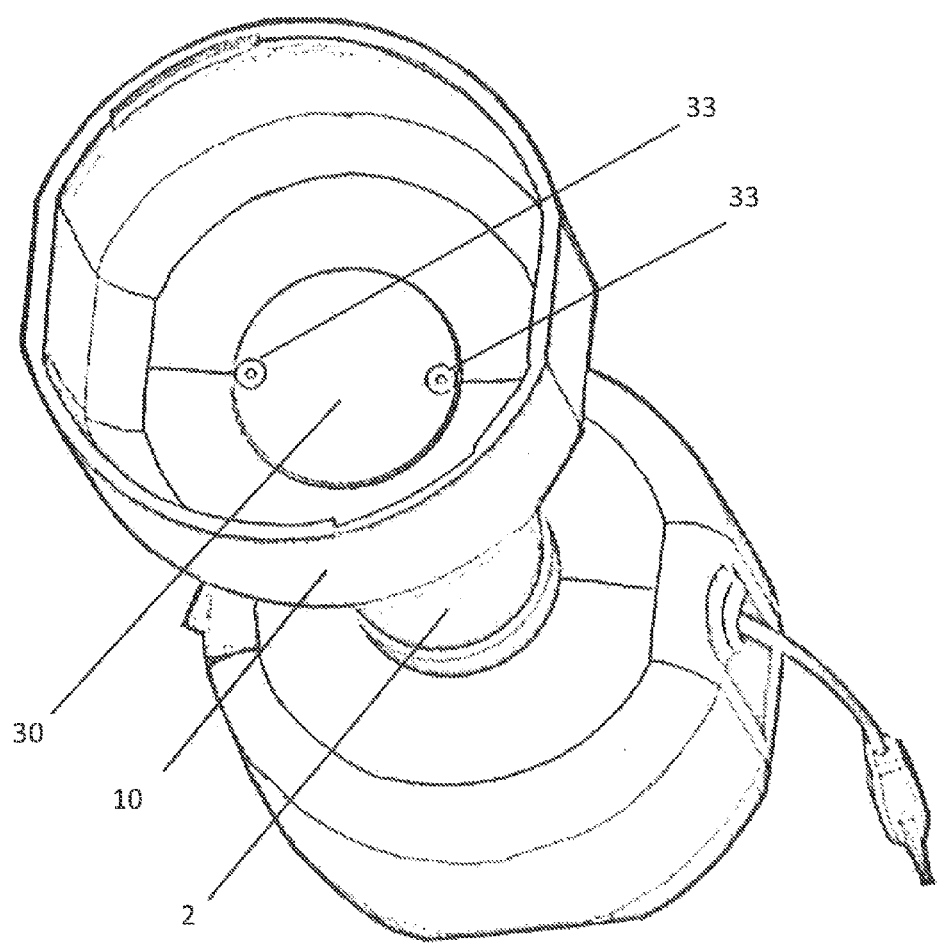
FIG. 4 is a perspective view of the pet leash assembly embodiment of the present disclosure, with a cover portion removed from a container of the pet leash assembly.

FIG. 4 shows a perspective view of the leash assembly according to the embodiment of FIG. 3, wherein container 10 has an opening (not shown) which allows a user to access the housing in the hand grip 2 to insert or remove the weighted insert. In this embodiment, removable plug 30 fits into the opening in the container and is fastened using screws 33. A person of skill in the art would understand that any suitable means may be used to reversibly secure the plug to the container or hand grip. For instance, the plug may engage the opening using a snap fit mechanism or by threadingly engaging the opening in the container. The plug may be made of a resilient material that may engage the opening. The plug is sized and shaped to close the opening and to retain the weight securely in the hand grip. The plug may be further sized to engage the weighted insert so that the weighted insert does not move about as the user is walking.

Figure 5:
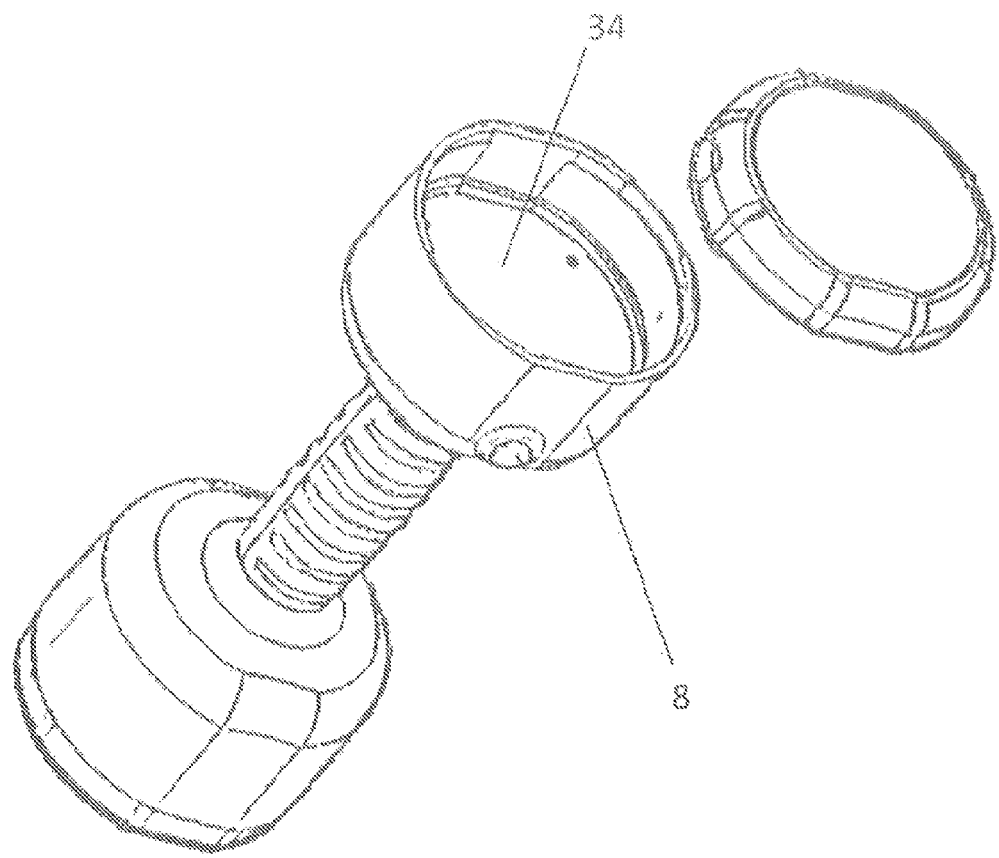
FIG. 5 is a perspective view of the pet leash assembly embodiment of FIG. 4, with the cover portion removed from the container of the pet leash assembly.

FIG. 5 shows the interior of a container 8 of the embodiment of a leash assembly of FIGS. 3 and 4. Container 8 comprises a retractable leash and a separating means in the form of a partition 34, that separates the leash mechanism from the body of the container 8 so that the container 8 may be used to store items without interfering with the retractable leash mechanism. The cover portion (not shown) is reversibly coupled to the container 8, thereby providing a cavity and allowing items to be stored therein when the container including the and cover portion are in a closed position. A user may insert any items that he/she wishes to carry into the container. Once the items have been placed in the container the cover portion may be replaced.

Figure 6:
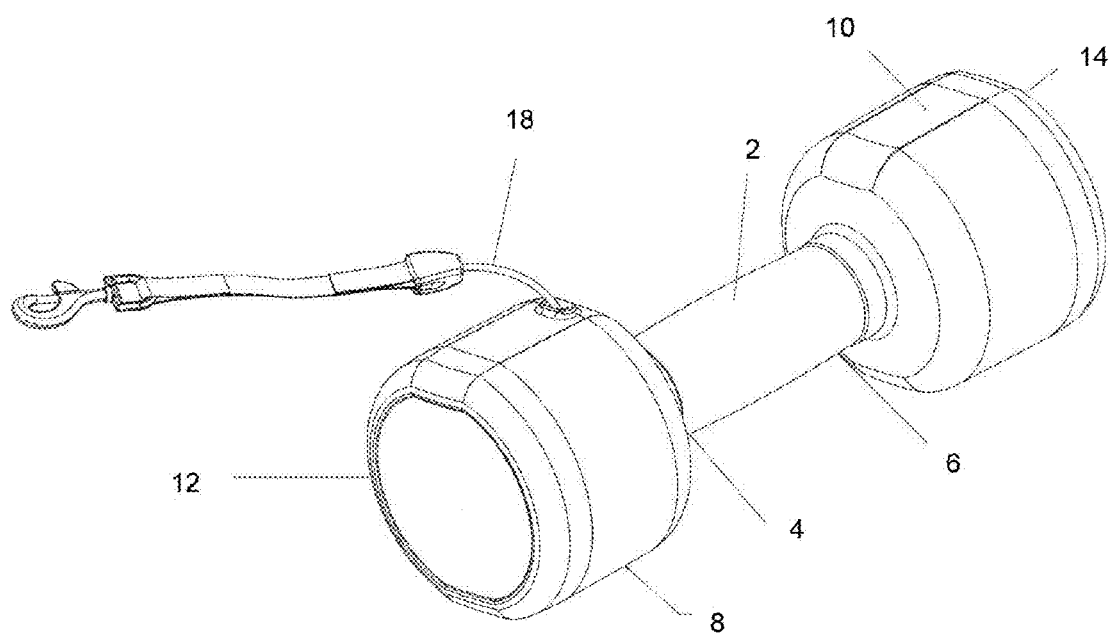
FIG. 6 is perspective view of another embodiment of a pet leash assembly in accordance with the present disclosure.

FIG. 6 is a perspective view of an embodiment of the leash assembly of the present disclosure in which the handgrip 2 is integral with container 8 and is reversibly coupled to container 10. Hand grip 2 has first and second ends 4, 6 and is coupled to containers 8 and 10. Hand grip 2 comprises a housing (not shown) defining an opening at the second end 6 for reversibly receiving a weighted material (not shown). Retractable leash 18 is housed within container 8 and is shown in detail in FIGS. 14.

Figure 7:
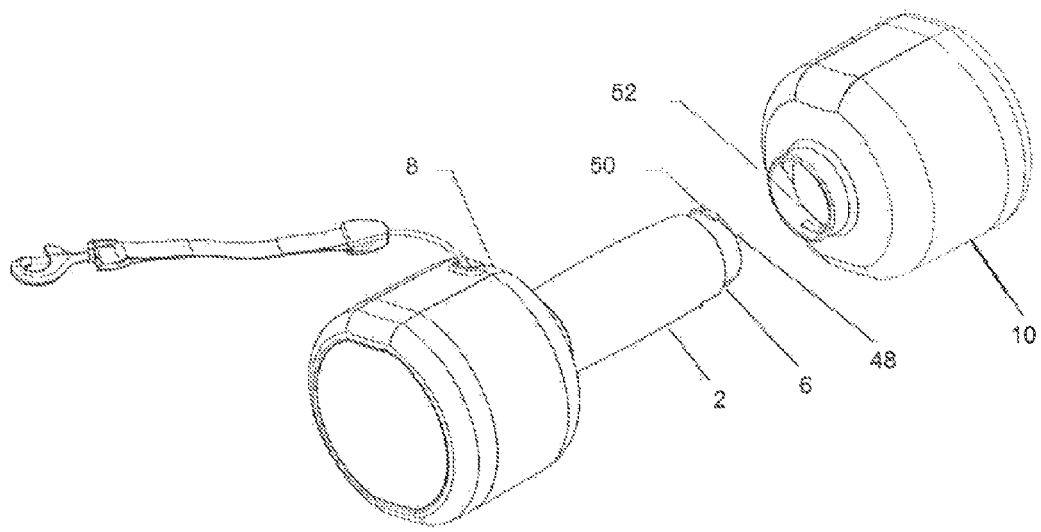
FIG. 7 is an exploded perspective view of the leash assembly of FIG. 6.

FIG. 7 shows an exploded view of the embodiment of FIG. 6. FIG. 7 shows how hand grip 2 reversibly couples with container 10. The hand grip 2 has at its second end 6, a projection 48, having a groove 50 which mates with a corresponding detent 52 formed on container 10 which allows for the reversible coupling of the hand grip 2 with container 10. The hand grip 2 is coupled to container 10 by slipping the container over the projection 48 and rotating the container in a clockwise direction about 15 degrees. Detent 52 aligns with groove 50 in the projection 48 and prevents the container from freely rotating, thereby holding the container in position. To remove the container from the hand grip the user applies pressure to the container and rotates the container in a counter clockwise direction a minimum of 15 degrees and pulls the container away from the hand grip. This allows the container to be removed and washed should the user desire.

Figure 8:
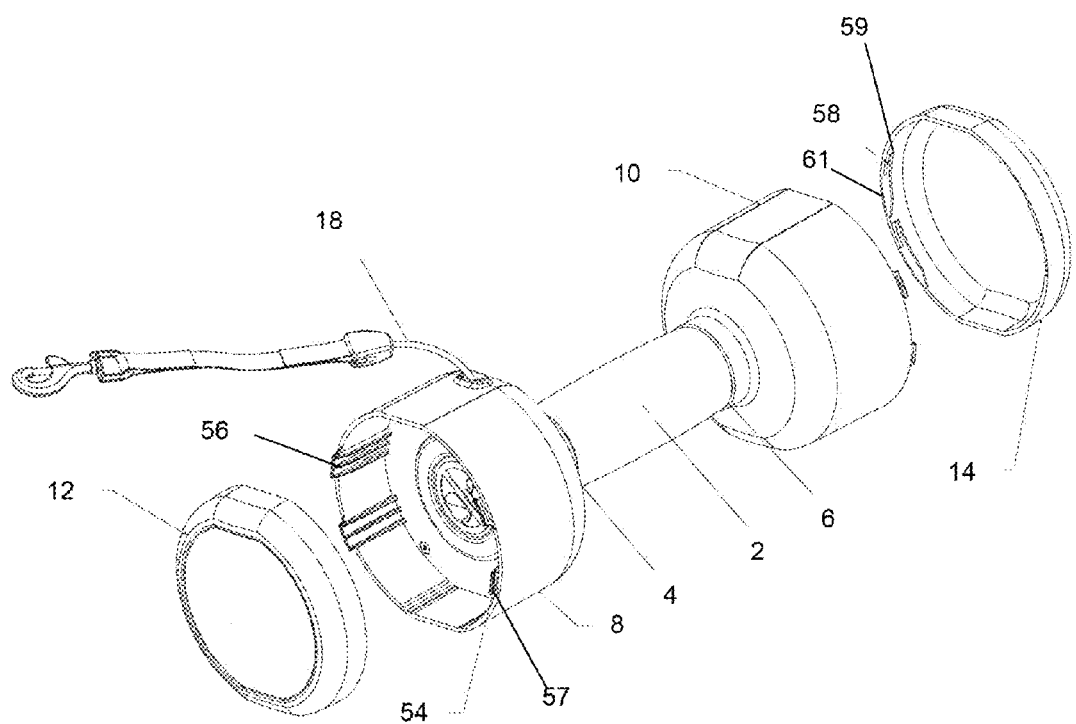
FIG. 8 is another exploded perspective view of the leash assembly of FIG. 6.

FIG. 8 shows an exploded view of the embodiment of the leash assembly of FIGS. 6 and 7 showing the coupling of cover portions 12 and 14 to containers 8 and 10. Containers 8, 10 are reversibly coupled to removable cover portions 12 and 14, to close or seal the containers. Containers 8, 10 have a plurality of protruding ribs 56 that define a tab 57 protruding from the container. The tabs 57 include an outward projection 54 that engages the detent mechanism 58 upon when the cover portion is coupled to the container.

In the present embodiment, the detent mechanism 58 includes a boss 59 defined in a groove 61 of the cover portion. Projection 54 fits in groove 61 of the cover portion, and engages the boss 59 when the cover portions 12, 14 are coupled to the container. Cover portions 12 and 14 are secured into place by slipping the cover portions over the projection 54 on the protruding ribs 56 on the containers and rotating the cover portion clockwise a minimum of 15 degrees. This prevents cover portions 12, 14 from freely rotating. In the present embodiment, to remove the cover portion, the user rotates the cover portion counter clockwise a minimum of 15 degrees and then pulls the cover portion away from the container. Removal of cover portion 14 allows access to the cavity (not shown) within the hand grip which may be used to house a weighted material. A removable plug (not shown) is inserted into the opening allowing access to the housing and retains the weighted material in place. A user may then insert or remove a weighted material from the housing. Containers 8, 10 are reversibly coupled to removable cover portions 12 and 14, to close or seal the container.

Figure 9:
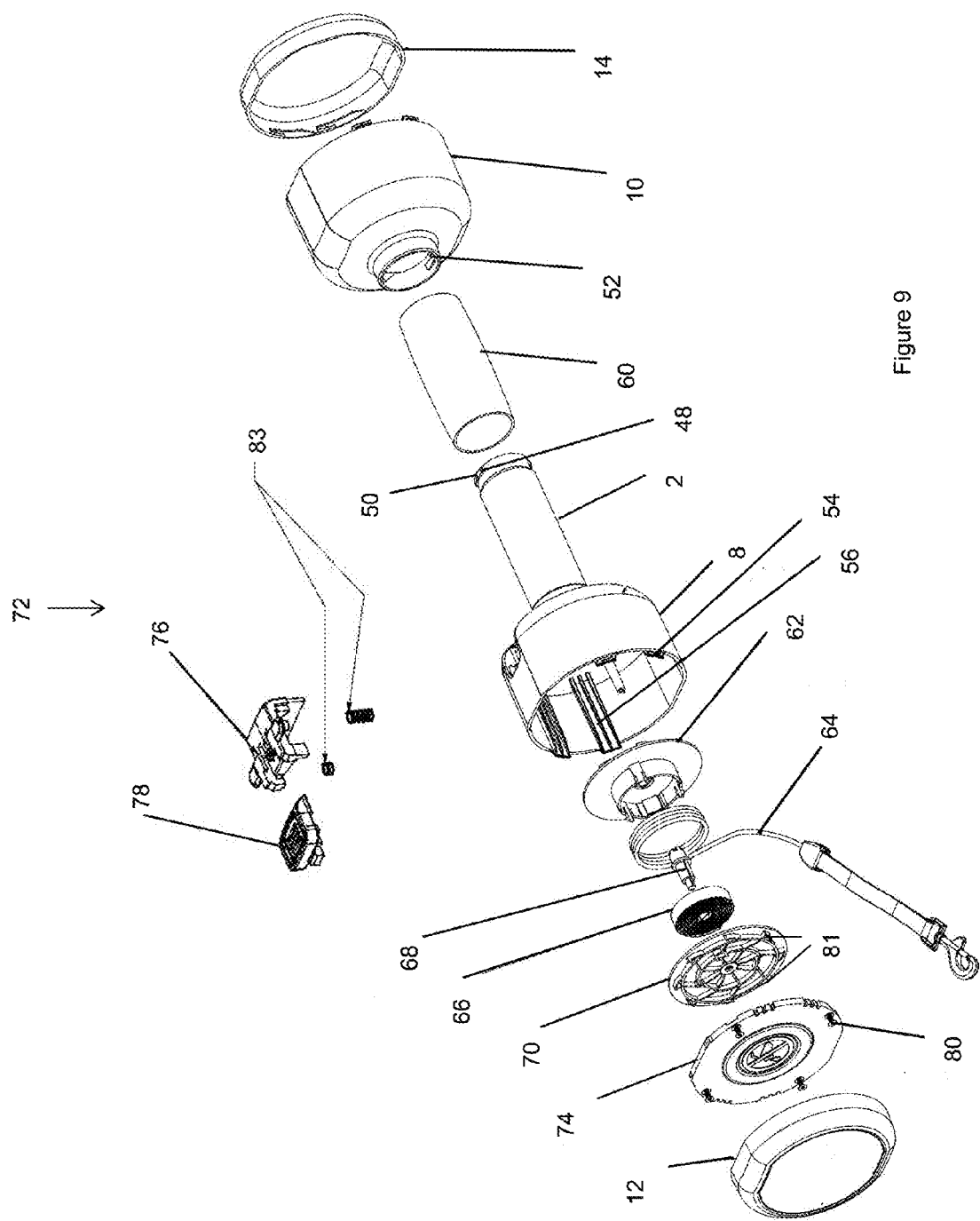
FIG. 9 is yet another exploded perspective view of the leash assembly of FIG. 6.
Figure 10:
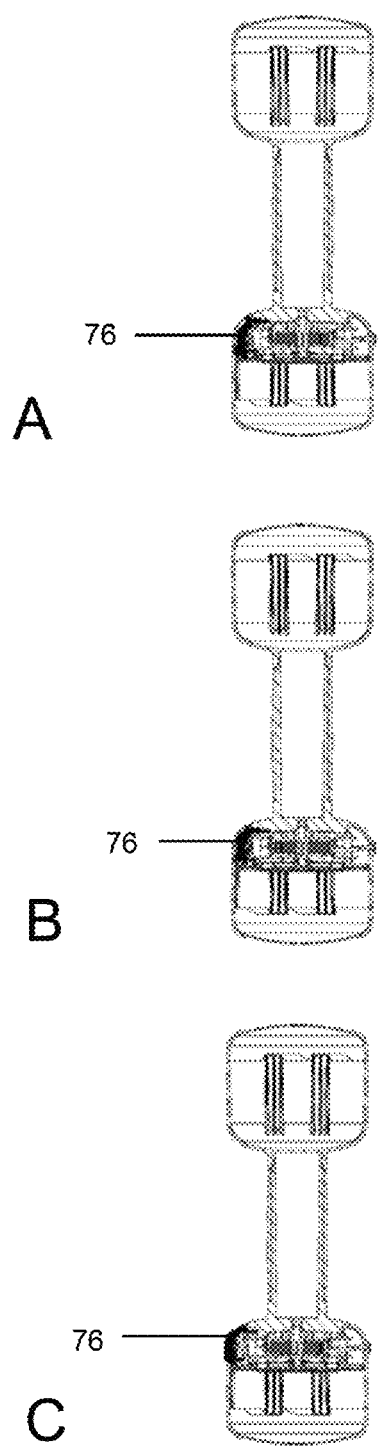
FIG. 10 shows various side views and side cross-sectional views of the leash assembly of FIG. 6, showing the positions of the leash button and actuator assembly.

FIG. 9 is an exploded view of the embodiment of the leash assembly of FIGS. 6 to 8 showing the retractable leash mechanism in further detail. In this embodiment, a sleeve 60 is slidably received on the hand grip 2. The hand grip 2 comprises a projection (not shown) having a groove (not shown) which mates with the corresponding detent 52 on container 10 which allows for the reversible coupling of the hand grip 2 with container 10. The hand grip 2 is formed integrally with container 8, which houses a retractable leash. Reel base 62 sits in the base of the container 8. Leash 64 is coiled around reel base 62 and feeds through an opening in the housing (not shown), allowing the leash to be extended out of the container in any direction. In this embodiment, the leash is a 16 foot leash that supports a 40 pound dog. Reel base 62 is connected to reel spring 66 and reel shaft 68 which biases the leash towards a retracted position where it is wound around the reel base 62. Reel cover 70 is operatively connected to the reel shaft and functions to stop extension of the leash in response to a user's engagement of actuator mechanism 72. Leash cover 74 is fixedly attached to the container using screws and serves to separate the retractable leash mechanism from the body of the container. The body of the container 8 may be used to store items. Container 8 is closed by coupling with cover portion 12. The actuator mechanism 72 comprises a leash button 76 connected to button base 78. Leash button 76 may be depressed to stop leash 64 from extending out of the housing, and/or to lock the leash at a desired length position as shown in FIG. 10. When the leash button 76 is depressed, a protrusion 79 of the leash button engages with one of the teeth 81 defined by the real cover 70, to prevent the leash from extending. Springs 83 bias the leash button to an unlocked position when the leash button 76 is not depressed. The containers 8 and 10 have formed therein groups of ribs 56 that protrude inside the container along an axis parallel to the hand grip 2. The ribs 56 are to align with indentations 80 formed on the leash cover 74. This allows the leash cover 74 to be properly positioned within the container 12.

FIG. 10 shows cross sectional side views of the leash assembly according to the embodiment of FIG. 9. Leash button 76 is moveable between several positions. Panel A shows the leash button in the default position. In panel B, leash button 76 is depressed and engages the reel mechanism to stop the leash from extending. In panel C, leash button 76 is slid forward to lock the leash at a desired length. The leash may be returned to the compartment by releasing leash button 76, allowing the leash to recoil around the reel base.

The above-described embodiments are intended to be examples only. Alterations, modifications and variations can be effected to the particular embodiments by those of skill in the art without departing from the scope, which is defined solely by the claims appended hereto.

What is claimed is:
1. A pet leash assembly comprising:
   a hand grip defining a recess, the recess for reversibly receiving a weighted insert such that the weighted insert is disposed substantially centrally in the hand grip so that, when in use, the weighted insert is substantially disposed in the palm of a user, wherein the hand grip has a first end and a second end, the second end being opposite the first end;
   a retractable leash operationally coupled to the hand grip;
   a first container coupled to the hand grip, the first container for receiving and retaining items to be stored therein;
   a removable cover portion coupled to the first container for closing the first container;
   a tab connected to the second end of the hand grip, the tab comprising an outward projection, the projection having a groove; and
   a detent mechanism connected to the first container;
   wherein the groove engages the detent mechanism when the hand grip is coupled to the first container; and
   wherein the retractable leash is operationally coupled to the first end and the first container is coupled to the second end.

2. The pet leash assembly according to claim 1, further comprising a second container coupled to the first end.

3. The pet leash assembly according to claim 2, wherein the retractable leash is housed within the second container.

4. The pet leash assembly according to claim 2, further comprising a second removable cover portion coupled to the second container for closing the second container.

5. The pet leash assembly of claim 2, wherein the second container is reversibly connected to the hand grip.

6. The pet leash assembly according to claim 1, wherein the weighted insert weighs at least 0.5 pound.

7. The pet leash assembly according to claim 1, wherein the weighted insert weighs at least 1 pound.

\* \* \* \* \*